J. H. WILHELM.
THREAD TESTING DEVICE.
APPLICATION FILED JUNE 19, 1918.

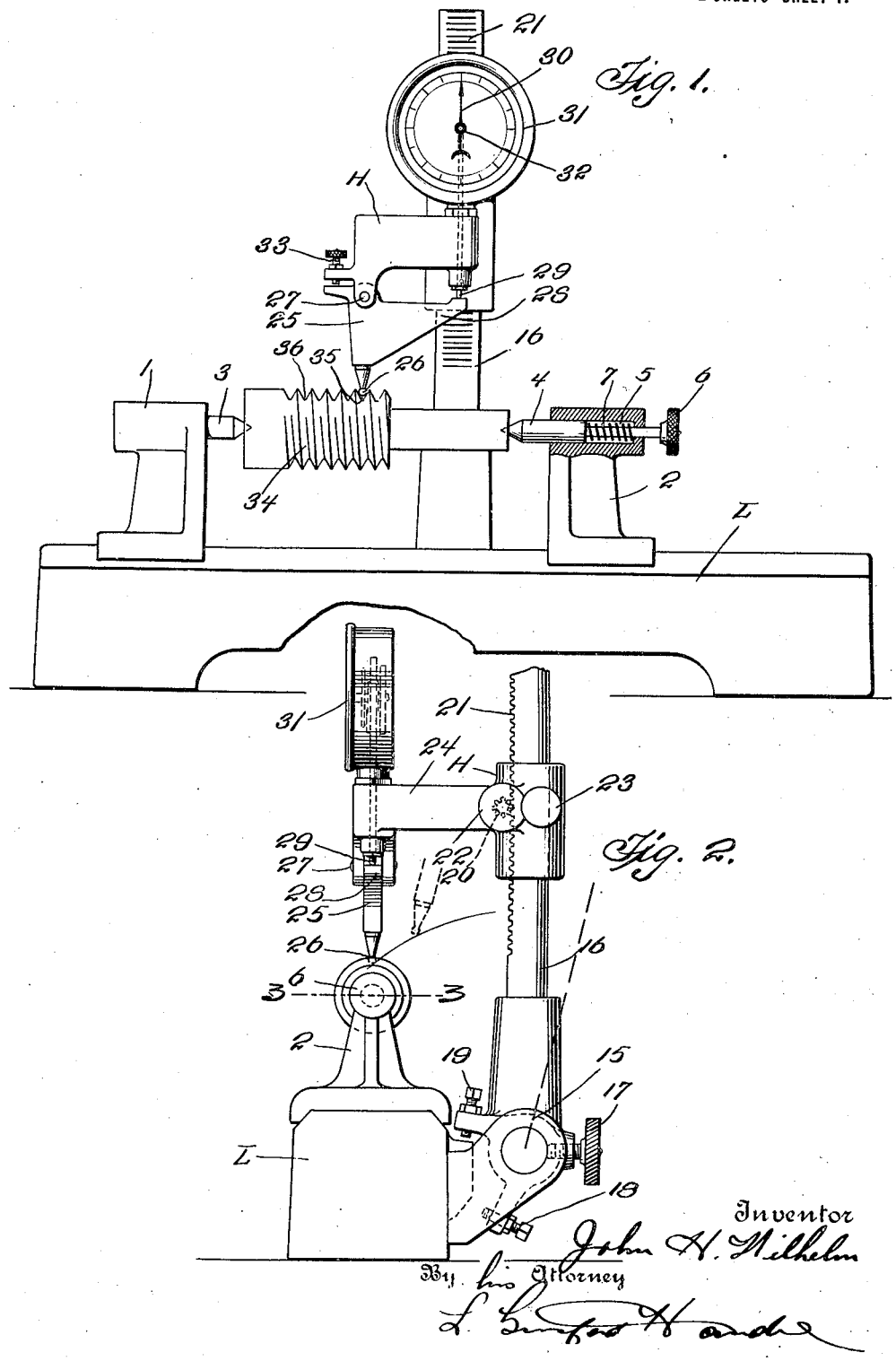

1,359,943.

Patented Nov. 23, 1920.
2 SHEETS—SHEET 2.

Inventor
John H. Wilhelm
By his Attorney

UNITED STATES PATENT OFFICE.

JOHN H. WILHELM, OF NEW YORK, N. Y., ASSIGNOR TO BLAIR TOOL & MACHINE WORKS, INC., OF NEW YORK, N. Y., A CORPORATION OF NEW YORK.

THREAD-TESTING DEVICE.

1,359,943. Specification of Letters Patent. Patented Nov. 23, 1920.

Application filed June 19, 1918. Serial No. 240,744.

*To all whom it may concern:*

Be it known that I, JOHN H. WILHELM, residing at New York, in the county of New York and State of New York, have invented certain new and useful Improvements in Thread-Testing Devices, of which the following is a specification.

This invention relates to a thread testing device, and particularly to a device for testing the lead of threads.

The object of the invention is to provide a simple, efficient and reliable device for this purpose.

A more detailed object is to provide improved means whereby certain parts of the device may be moved from one position to another with great ease and accuracy.

A further detailed object is to provide means for properly supportnig the screw to be tested, to provide a testing element so mounted that it may be easily and accurately moved into and out of coöperative relation with a number of screws to be tested, and to provide means for easily and accurately moving the testing element an exact required distance along the length of the screw for the purpose of making the complementary measurement of the test.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention.

Figure 1 is a front elevational view of a device constructed in accordance with this invention.

Fig. 2 is an end elevational view of the structure shown in Fig. 1.

Figure 3:
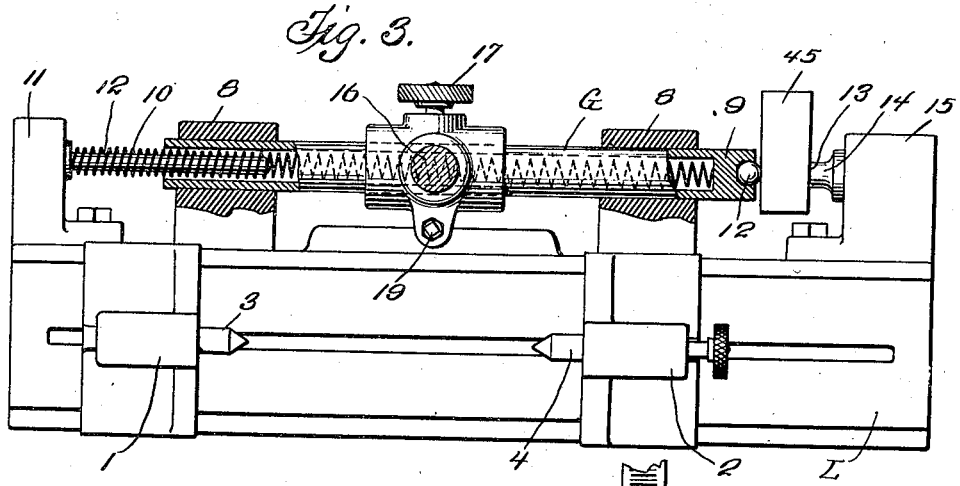
Fig. 3 is a top plan view showing a portion of the structure in horizontal section upon the plane of line III of Fig. 2.

Referring to the drawings for describing in detail the exemplary structure illustrated therein, and considering first the structures shown in Figs. 1 to 3, the reference character L indicates the bed plate, or base, from which rise two standards 1 and 2. Either one, or both of these standards may be adjustable longitudinally of the bed and together they supply a pair of center points, or the like, as 3 and 4, by means of which the work may be suitably supported. At least one of the center points, as 4, is adjustable in its standard for the purpose of facilitating the easy and quick removal and replacement of the work.

Any suitable means may be provided to render the point 4 adjustable, for this purpose, but for convenience it is illustrated as being longitudinally slidable within a bore 5 formed in the standard 2. A head, or handle, 6 is formed at the outer end for sliding it and a compression spring 7 is provided within the bore for normally urging the center outwardly and into supporting engagement with the work.

At the rear of the bed is arranged a slidable shaft G parallel with the bed and slidably supported in brackets 8. The shaft G is hollow, being closed at one end only, as at 9. A compression spring 10 is arranged within the shaft having its inner end abutting the portion 9 and having its outer end projecting from the opposite end of the shaft and into engagement with an abutment 11 carried by the bed. A rod 12 carried by the abutment 11 preferably extends centrally through the spring so as to maintain the spring in proper alinement at all times.

The spring 10 normally holds the shaft pressed to the right (in Fig. 3) so that an anti-friction ball 12, of hardened steel positioned in the right hand end of the shaft, rests against the flat polished surface 13 of a hardened steel anvil 14 which is supported rigidly in position from the bed by a suitable bracket 15.

Carried by the shaft G, preferably intermediate the brackets 8 is a standard 16. This standard may be rigidly connected with the shaft, as by means of a set screw, or the like 17, and suitable stops, preferably adjustable, as at 18 and 19, are provided at the lower part of the standard for engaging fixed parts of the bed to limit swinging movement of the standard and shaft within the brackets 8.

A carrier H is mounted upon the standard 110

16 to slide vertically therealong. Any suitable means may be provided for effecting the vertical adjustment of the carrier and for example the carrier is fitted with a small gear 20 the teeth of which engage the teeth of a rack 21 formed along one surface of the standard. A suitable thumb grip 22 is provided for rotating the gear so as to cause the carrier to travel upwardly or downwardly along the standard, and a thumb screw 23 is provided to serve as means for locking the carrier in any position of adjustment along the standard.

The carrier includes an arm 24 which projects forwardly from the standard and carries a testing element in the form of a bell-crank member 25 which is pivotally supported at the forward end of the arm upon an axis 27 extending in a plane transverse to a line between the center points 3 and 4.

The bell-crank member 25 is arranged with one of its arms projecting downwardly and with its other arm projecting horizontally to the right (in Fig. 1). The downwardly projecting arm carries a hardened steel ball point 26 at its lower end which is adapted to engage between the threads of the screw being tested, and the pivotal mounting of said member 25, at a point, as 27, which is substantially directly above the point of engagement of the ball 26, with the threads, enables the ball 26 readily to center itself between the inclined walls of the threads. The horizontally extending arm, as 28, has its free end positioned beneath the lower end of an operating rod 29 which is carried by the arm 24 and which is connected for operating the pointer 30 of a suitable gage 31.

A suitable adjustable stop 33 is provided for limiting the swinging movement of the bell-crank 25.

In order to operate this device for testing the lead of a given screw, as for instance the screw 34 illustrated, the carrier H is moved vertically of the standard 16 as by means of the gear and ratchet 20—21, to a position in which, when the standard is swung with the shaft G, in the brackets 8, the ball point 26 will just engage lightly within one of the thread grooves, as 35, of the screw. As the ball falls into position in the groove 35, it may, or may not, swing the bell-crank 25 slightly about the pivot 27 and cause a movement of the pointer 30. If any movement of the pointer 30 takes place at this time, the pointer is manually moved back to its zero position.

To take the complementary reading, if there are supposed to be thirteen threads to each inch of the screw, the standard 16 is swung back to disengage the ball point 26 from the groove 35, and the standard, with the shaft G, is moved to the left one inch. It is then swung forward again so that the ball point falls into a different groove, as for instance the groove 36. If the thread is accurate the pointer 30 will register zero. If the thread is inaccurate and the groove 36 is more or less than one inch from the groove 35, the bell-crank 25 will be caused to swing to the right or to the left and will operate the rod 29 for moving the pointer to indicate the degree of inaccuracy.

While any suitable means may be provided for moving the standard an exact distance from the initial to the complementary position, the ball 12 and the anvil 14 are especially provided to receive between them members 45 which are commonly known as Johansson blocks. These blocks are small rectangular members of exact known thicknesses and rest easily and accurately against the polished surface of the anvil, with the ball 12 pressing from the opposite side. The spring 10 which, by reason of being received within the hollow of the shaft is very long, exerts a firm pressure of the ball against the block. The likelihood of inaccuracy is very small. The length of the spring also admits of its imparting a substantially uniform pressure of the ball against the block whether the block be a thin one or a thick one.

If desired, the set screw 17 for fixing the standard 16 to the shaft G may be releasable so that the standard may be adjusted to a greater or less extent along the length of the shaft G so as thus to better accommodate the device to different types of work held between the points 3 and 4.

Figure 4:
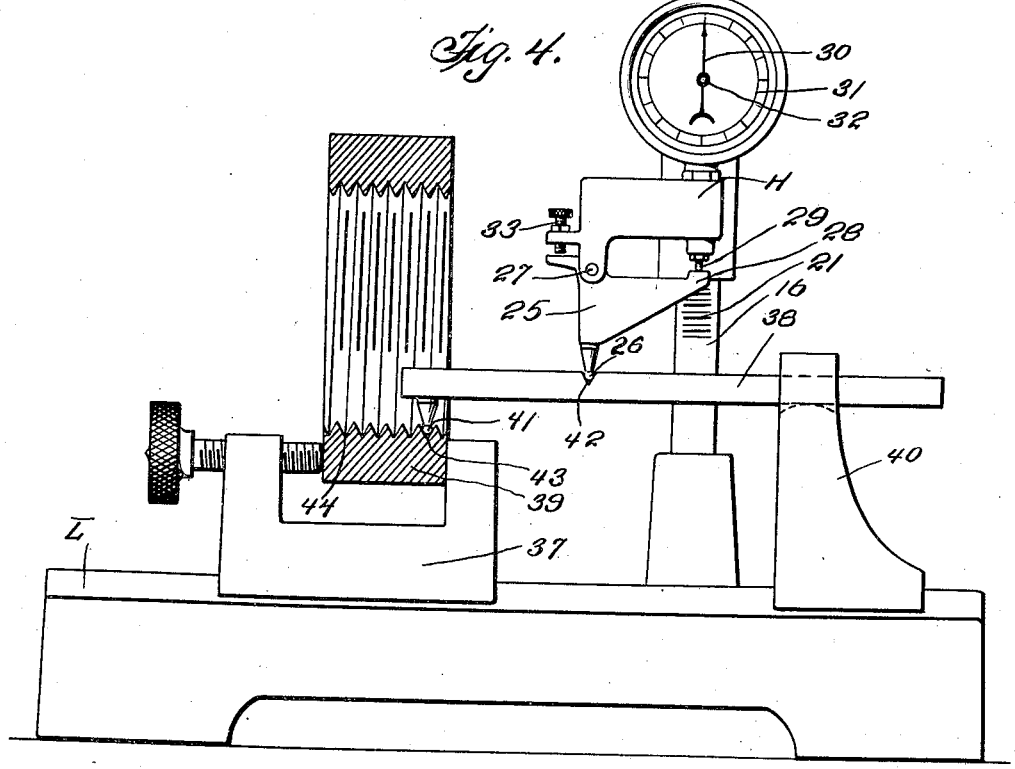
Fig. 4 is a view similar to a portion of Fig. 1, but illustrating the application of the invention to internal thread.

In the structure disclosed in Fig. 4, the entire mechanism is the same in every respect except that a different supporting device, as 37, is provided in lieu of the standards 1 and 2, and the supporting points 3 and 4, and except that an additional element, as 38, is provided for use in measuring the internal threads of a piece of work such as that shown at 39.

The part 37 may be of any suitable form but preferably comprises a clamp for holding the work.

The element 38 is simply a rod supported by one end in a suitable bracket 40 and having a hardened steel ball point 41 projecting laterally at its opposite end for resting in the thread groove as does the ball 26 above described. A V-groove or notch 42 is provided in the upper surface of the rod for receiving the ball point 26 in the same manner as said point 26 was received by the groove 35 in Fig. 1.

In operating this modification, the initial reading is taken with the point 41 in one thread groove, as 43. To take the complementary reading the standard is swung back and moved along to accommodate a Johansson block of a given required thickness between the ball and anvil 12 and 14. The rod 38 is then moved to engage the point 41 within another thread groove, as 44, which groove is the one which should be of the given required distance from the groove 43, and the standard is again moved forward to engage the groove 42. Any inaccuracy of distance between the grooves 43 and 44 will appear upon the dial of the indicator 31.

It will be noted that the element 38 constitutes simply a means for duplicating the internal threads as external threads in a position of accessibility to the ball point 26.

Although I have shown and described an indicator having a pivotally mounted pointer it will be understood that this invention is not in any way limited to this particular type of indicator, as other types may be constituted with equally satisfactory results. The essential characteristic of this invention in this particular is simply that the indicator be of a type such that it indicates any swinging movement of the member 25 relatively to the arm 24 of the carrier H.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:

1. A lead testing device for screws, comprising a testing element having a part to engage the screw threads, means pivotally supporting the testing element to swing about an axis which extends transverse to the length of the screw, and means whereby the testing element may be bodily moved laterally of the screw, together with an indicator for indicating movement of said testing element about its pivotal support.

2. A lead testing device for screws, comprising a testing element having a part to engage the screw threads, means pivotally supporting the testing element to swing about an axis transverse to the length of the screw, means whereby to displace the testing element bodily from engagement with one thread of the screw and into engagement with another thread of the screw, together with an indicator for indicating movement of said testing element about its pivotal support.

3. A lead testing device for screws, comprising a testing element having a part to engage the screw threads, means pivotally supporting the testing element to swing about an axis transverse to the length of the screw, a carrier arranged to move the testing element in a direction laterally and longitudinally of the screw so that said mentioned part of the testing element may engage spaced threads of the screw, together with an indicator for indicating movement of said testing element about its pivotal support.

4. A lead testing device for screws, comprising a testing element having a part to engage the screw threads, means pivotally supporting the testing element to swing about an axis transverse to the length of the screw, a pivotally mounted carrier for said testing element by means of which to move the testing element laterally of the screw, together with an indicator for indicating movement of said testing element about its pivotal support.

5. A lead testing device for screws, comprising a testing element having a part to engage the screw threads, means pivotally supporting the testing element to swing about an axis transverse to the length of the screw, a pivotally mounted carrier for said testing element by means of which to move the testing element laterally of the screw, the pivotal mounting of the carrier being of a character to permit movement of the carrier longitudinally of the screw, and an indicator for indicating movement of said testing element about its pivotal support.

6. A lead testing device for screws, comprising a testing element having a part to engage the screw threads, means pivotally supporting the testing element to swing about an axis transverse to the length of the screw, a pivotally mounted carrier for said testing element by means of which to move the testing element laterally of the screw, the pivotal mounting of the carrier including a pivot shaft and supports therefor within which said shaft is rotatably and slidably movable whereby to permit movement of the carrier longitudinally of the screw, together with an indicator for indicating movement of said testing element about its pivotal support.

7. A lead testing device for screws, comprising a testing element having a part to engage the screw threads, means pivotally supporting the testing element to swing about an axis transverse to the length of the screw, a pivotally mounted carrier for said testing element by means of which to move the testing element laterally of the screw, the pivotal mounting of the carrier including a pivot shaft and supports therefor within which said shaft is rotatably and slidably movable whereby to permit movement of the carrier longitudinally of the screw, means urging said shaft in one direction, an anvil disposed to obstruct movement of the shaft in said direction, and a measuring block adapted to be inserted between said shaft and said anvil to determine the extent of movement of the carrier longitudinally of the screw, together with an indicator for indicating movement of said testing element about its pivotal support.

8. A lead testing device for screws, comprising a testing element having a part to engage the screw threads, means pivotally supporting the testing element to swing about an axis transverse to the length of the screw, a pivotally mounted carrier for said testing element by means of which to move the testing element laterally of the screw, the pivotal mounting of the carrier including a pivot shaft and supports therefor within which said shaft is rotatably and slidably movable whereby to permit movement of the carrier longitudinally of the screw, said shaft being hollow, a spring arranged in the hollow of the shaft and having engagement with a fixed portion of the bed to urge said shaft in one direction, an anvil arranged in line with said shaft to be engaged thereby for obstructing movement of the shaft in said direction, and a measuring block adapted to be inserted between the end of the shaft and said anvil to determine the extent of movement of the carrier longitudinally of the screw, together with an indicator for indicating movement of said testing element about its pivotal support.

9. A lead testing device for screws, comprising a testing element having a part of a character to engage the screw threads, means pivotally supporting the testing element to swing about an axis transverse to the length of the screw, means whereby the testing element may be moved bodily laterally of the screw, and a separately formed member having a part at one point thereon adapted for engaging the screw thread and having at another point thereon a notch constituting a substitute screw thread, said member being movable to engage the first mentioned parts thereof with different threads of the screw, and said substitute thread being of a character to be engaged by the mentioned part of the testing element, together with an indicator for indicating movement of said testing element about its pivotal support.

10. A lead testing device for screws, comprising a testing element having a part to engage the screw threads, supporting means for said testing element of a character to permit movement of the testing element longitudinally of the screw being tested to thereby enable engagement of said part with spaced threads of the screw, and an indicator connected for indicating any variation in the engagement of said part with the spaced threads.

11. A lead testing device for screws, comprising a testing element having a part to engage the screw threads, supporting means for said testing element of a character to permit movement of the testing element longitudinally of the screw being tested to thereby enable engagement of said part with spaced threads of the screw, the testing element being subject to variation of movement relatively to the support while making initial and complementary measurements, and an indicator for indicating the degree of variation.

In testimony whereof I affix my signature in the presence of two witnesses.

JOHN H. WILHELM.

Witnesses:
L. GESSFORD HANDIE,
MAY SCHULZ.